US007242546B2

(12) United States Patent
Ooi et al.

(10) Patent No.: US 7,242,546 B2
(45) Date of Patent: Jul. 10, 2007

(54) DETERMINING A LOCATION BASED ON A CYCLIC BIT SEQUENCE CONTAINING CONSECUTIVELY-PLACED IDENTICAL BIT-GROUPS

(75) Inventors: KianKeong Ooi, Singapore (SG); WingKong Chiang, Singapore (SG); MingZhong Ding, Singapore (SG); WeiSung Lee, Singapore (SG); EikFun Khor, Malaysia (MY); BengWee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 201 days.

(21) Appl. No.: 10/685,076

(22) Filed: Oct. 13, 2003

(65) Prior Publication Data
US 2005/0078396 A1 Apr. 14, 2005

(51) Int. Cl.
*G11B 5/09* (2006.01)
(52) U.S. Cl. ............... 360/48; 360/51; 360/77.05; 360/53; 360/49
(58) Field of Classification Search ............ 360/77.02, 360/77.05, 48, 51, 53
See application file for complete search history.

(56) References Cited

U.S. PATENT DOCUMENTS

| | | | |
|---|---|---|---|
| 5,162,954 A | 11/1992 | Miller et al. | |
| 5,442,499 A * | 8/1995 | Emori | 360/77.08 |
| 5,523,903 A * | 6/1996 | Hetzler et al. | 360/77.08 |
| 5,596,460 A | 1/1997 | Greenberg et al. | |
| 5,748,401 A * | 5/1998 | Kawai | 360/78.14 |
| 5,757,568 A | 5/1998 | Greenberg et al. | |
| 5,805,368 A | 9/1998 | Hishikawa | |
| 5,903,410 A | 5/1999 | Blaum et al. | |
| 5,905,603 A * | 5/1999 | Ogasawara et al. | 360/77.08 |
| 5,946,328 A * | 8/1999 | Cox et al. | 714/784 |
| 6,034,831 A * | 3/2000 | Dobbek et al. | 360/53 |
| 6,049,438 A | 4/2000 | Serrano et al. | |
| 6,104,558 A * | 8/2000 | Greenberg et al. | 360/49 |
| 6,144,514 A | 11/2000 | Wu | |
| 6,259,577 B1 * | 7/2001 | Ahn | 360/78.14 |
| 6,288,861 B1 | 9/2001 | Blaum et al. | |
| 6,320,712 B1 * | 11/2001 | DeForest | 360/49 |
| 6,327,105 B1 | 12/2001 | DeForest | |
| 6,404,582 B1 | 6/2002 | Rodrigues de Miranda | |
| 6,433,948 B1 * | 8/2002 | Lee | 360/75 |
| 6,504,664 B1 * | 1/2003 | Zook | 360/51 |
| 6,603,627 B1 * | 8/2003 | Chainer et al. | 360/75 |
| 6,657,800 B1 * | 12/2003 | Ozdemir et al. | 360/40 |
| 6,687,078 B1 * | 2/2004 | Kim | 360/77.04 |
| 6,885,321 B1 * | 4/2005 | Blaum et al. | 341/98 |
| 6,934,114 B1 * | 8/2005 | Codilian et al. | 360/77.08 |
| 6,952,322 B1 * | 10/2005 | Codilian et al. | 360/77.05 |
| 2002/0057516 A1 * | 5/2002 | Holsinger | 360/72.1 |
| 2003/0011918 A1 * | 1/2003 | Heydari et al. | 360/39 |
| 2003/0161067 A1 * | 8/2003 | Ramler et al. | 360/77.05 |
| 2004/0100719 A1 * | 5/2004 | Wilson et al. | 360/75 |
| 2004/0148558 A1 * | 7/2004 | Lapstun et al. | 714/781 |
| 2005/0041321 A1 * | 2/2005 | Settje et al. | 360/77.02 |

* cited by examiner

*Primary Examiner*—Wayne Young
*Assistant Examiner*—Dismery Mercedes
(74) *Attorney, Agent, or Firm*—Leanne R. Taveggia; Westman, Champlin & Kelly, P.A.

(57) ABSTRACT

A location within a cycle is determined by reading a portion of a cyclic bit sequence, the bit sequence containing several interspersed bit-group sets that each contain a plurality of series that each consist of several consecutively-placed identical bit-groups. On a data surface in a disc drive, each bit group can be stored and accessed in unused bits of each servo sector's digital portion.

24 Claims, 5 Drawing Sheets

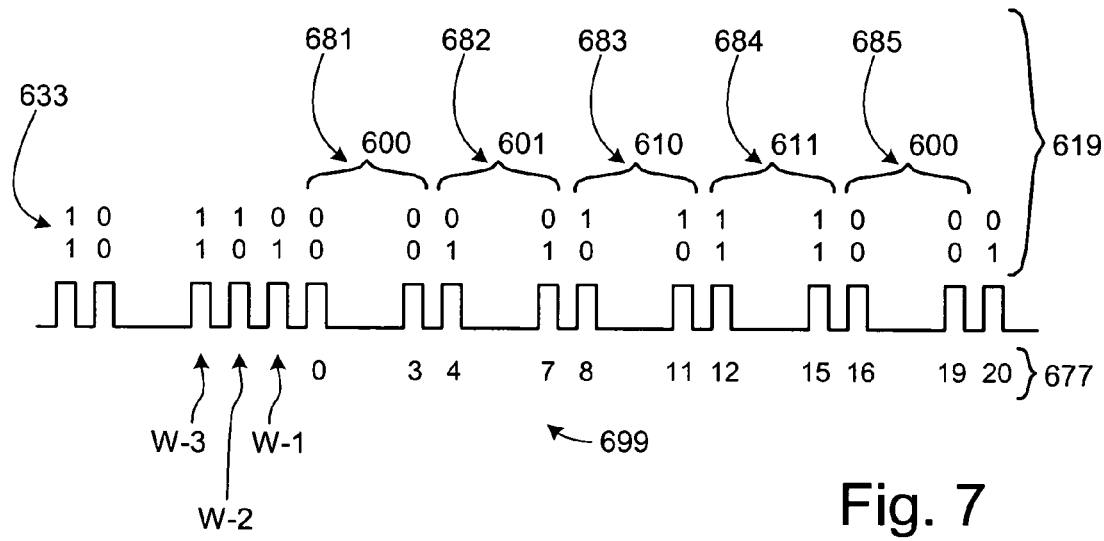
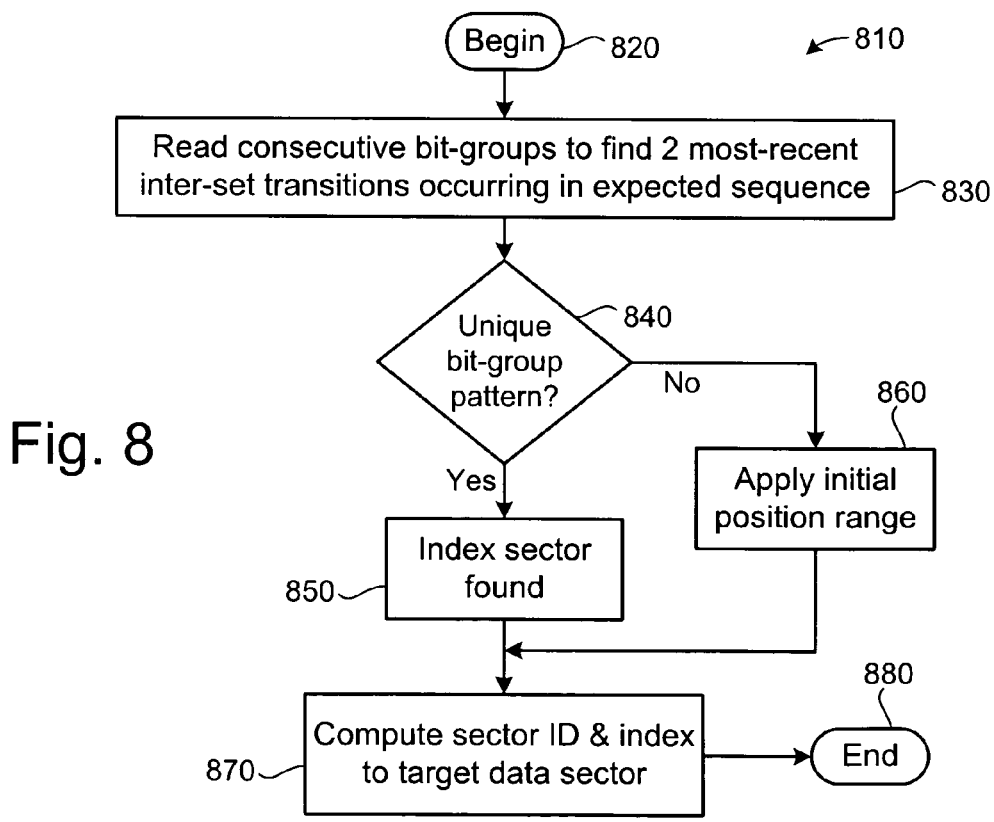
Fig. 7
Fig. 8

DETERMINING A LOCATION BASED ON A CYCLIC BIT SEQUENCE CONTAINING CONSECUTIVELY-PLACED IDENTICAL BIT-GROUPS

FIELD OF THE INVENTION

This application relates generally to cyclic bit sequences and more particularly to those designed for determining a location.

BACKGROUND OF THE INVENTION

Cyclic bit sequences can be used in a variety of monitoring applications, and they are particularly useful for determining a coarse location (e.g. a sector number) in an electromechanical data storage device. A typical disc drive, for example, includes a spindle motor rotating one or more discs at a constant high speed. Information is ordinarily written to and read from circular tracks on the discs through the use of an actuator assembly that includes a head that flies in close proximity above the corresponding surface of the associated disc. In a disc drive utilizing an embedded sector servo system, each track includes servo sectors that are separated by data sectors. Each servo sector includes a track identification code that can be unscrambled to determine a track number that uniquely identifies the track. Track identification codes are typically encoded in Gray code, a system for reducing the impact of an error due to a radial position change that occurs while reading a track identifier.

In a typical cyclic bit sequence, each servo sector also includes one bit that identifies an index location on the track. For example, one servo sector (the index servo sector) on each track can include a "1" in the index bit, while all other servo sectors include a "0" in the index bit. The index bit serves as the starting point for determining angular (or circumferential) position of a head relative to a data surface of a disc. Once the index bit has been encountered, the disc drive includes a counter that increments each time another servo sector is encountered. Thus, the index servo sector is often servo sector number zero; the next servo sector encountered by the head is servo sector number one, etc.

There are a variety of circumstances when it is desirable to know the circumferential position without waiting for the index bit to be detected, which may take an entire disc revolution or more. For example, drives with multiple discs frequently switch heads so that a different data surface can be read or written to. This may necessitate a detection of the position, unless angular alignment between the surfaces can be presumed. This may not be the case, for example, due to recent changes in manufacturing technology or due to a small displacement from a mechanical shock. The above-described bit sequence is also vulnerable to a read error or a point defect that may prevent a successful index mark detection.

Accordingly there is a need for better systems for determining a location by using a cyclic bit sequence, ones that create a more favorable combination of speed and robustness, yet maintain a suitable degree of format efficiency. The present invention provides a solution to this and other problems, and offers other advantages over existing systems.

SUMMARY OF THE INVENTION

Against this backdrop the present invention has been developed. A first embodiment of the present invention may be described as a method of determining a location within a cycle by reading a portion of a cyclic bit sequence, the bit sequence containing several interspersed bit-group sets that each contain a plurality of series that each consist of several consecutively-placed identical bit-groups.

A second method embodiment of the present invention includes at least five steps, although some variation or overlap in the order is permissible. The first step is writing many M-bit set labels each into a respective servo sector so as to define a cyclic bit sequence, where M>1, the bit sequence containing several interspersed bit-group sets that each contain a plurality of series that each consist of 2^N of the set labels, where N>1, each of the series consisting of the set labels of each of several circumferentially consecutive ones of the servo sectors, all of the set labels within each of the sets being identical. The second step is assembling at least first and second discs onto a disc stack so that the discs are angularly aligned within a predetermined threshold such as 15°. Alternatively or additionally, a calibration step will be inserted here, measuring the angular offset between the discs. The third step is reading several servo fields from the data surface, each of the servo fields consisting of a digital portion and an analog portion, each of the digital portions consisting of a set label and a remainder portion The fourth step is activating a transducer that reads at least some of the bit-groups and detects an inter-set transition. The fifth step, performed within one disc revolution, is determining a current sector number on the data surface based on a combination of the inter-set transition and on a pre-switch position detected on the second disc, making this determination not based on the digital remainder portions.

A third method embodiment is one of the previous ones, modified by the inclusion of a step of reading from or writing to a sector that is located by using a suitable delay with the determined location or sector number.

A fourth method embodiment is one of the previous ones, modified by the inclusion of a step of writing each of the set labels as a mutually adjacent bit-group within a respective servo field and within a few (at most M=7) nominal bit-lengths of a respective track identifier. Moreover the sets are selected so that each of the bit-groups in the set uniquely identifies the set.

A fifth method embodiment is one of the previous ones, modified by the inclusion of a step of writing several of the series consecutively and so that the series each consist of exactly S consecutively-placed bit-groups, where S=2^N, and N is an integer. Some of the sets optionally include shorter series also. A first position is measured on the first disc, after which part of the cyclic bit sequence is read from the second disc. The sector number or other location indicator is determined based on a combination of the first position and the just-read sequence portion.

A sixth embodiment method embodiment is one of the previous ones, modified by the inclusion of steps of reading a bit pattern from a data surface containing the cyclic bit sequence and verifying that the bit pattern is consistent with the bit sequence.

A seventh embodiment is a device including at least one rotatable element containing a cyclic bit sequence. The bit sequence contains several interspersed bit-group sets that each contain a plurality of series that each consist of several circumferentially consecutive identical bit-groups. The device also includes a controller configured to determine an angular location on the element by reading a plurality of the bit-groups.

An eighth embodiment is a device as described above, in which the cyclic bit sequence resides on one annular data surface of the rotatable element, in which the data surface includes a multitude of servo sectors each containing one of the bit-groups, the bit-groups being very small compared to the digital portion of the servo sector, and preferably at most 4 to 6 bits each.

A ninth embodiment is a device as described above, in which each of the bit-groups is an M-bit set-identifying label that identifies a respective one of the several sets. Note that this allows a maximum of 2^M self-labeling sets.

Additional features and benefits will become apparent upon reviewing the following figures and their accompanying detailed description.

BRIEF DESCRIPTION OF THE DRAWINGS

FIG. 7 shows a simplified schematic view of several items in FIG. 6.

FIG. 8 shows a flowchart of another method of the present invention, optionally performed by a controller of FIG. 6 upon a bit sequence as shown in FIGS. 6 & 7.

DETAILED DESCRIPTION

Figure 1:
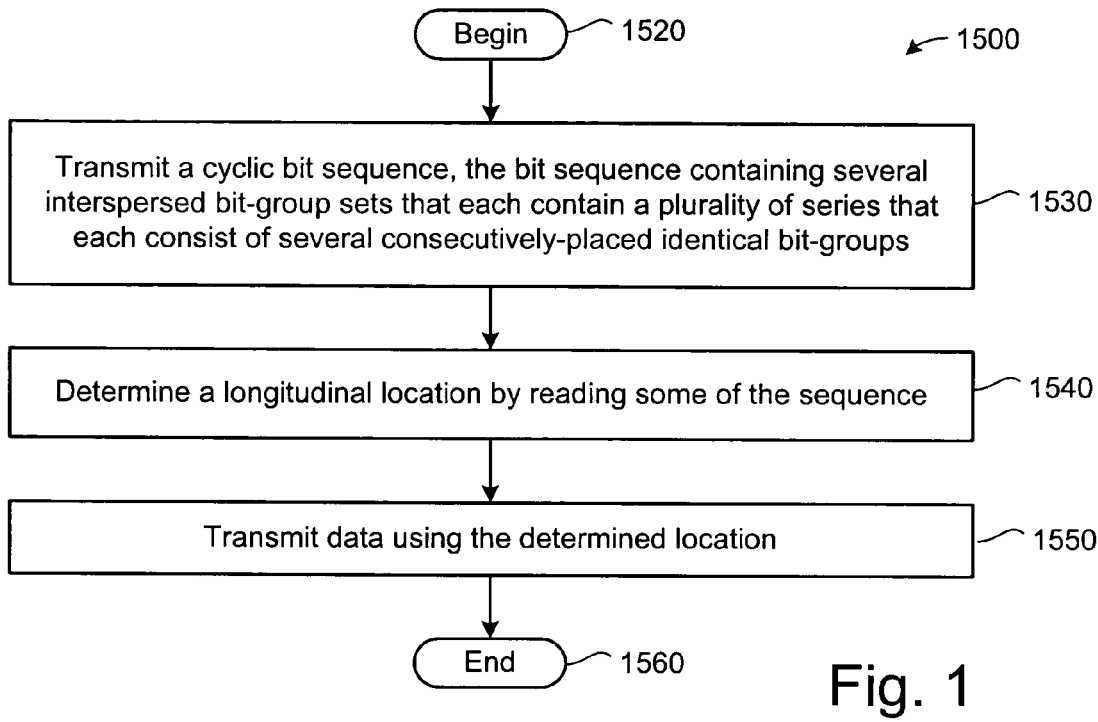
FIG. 1 shows a flowchart of a method of the present invention.

Although the examples below show more than enough detail to allow those skilled in the art to practice the present invention, subject matter regarded as the invention is broader than any single example below. The scope of the present invention is distinctly defined, however, in the claims at the end of this document.

To avoid needless distractions from the essence of the present invention, like-numbered reference numerals appearing in a later figure refer to the same elements as those in an earlier figure, to the extent that their descriptions are consistent. Also, numerous aspects of basic engineering and of positioning technologies that are not a part of the present invention (or are well known in the art) are omitted for brevity. For example, this document does not articulate detailed and diverse methods for writing a servo sector. Neither does it include implementation decisions such as what kind of error correction codes to use or what the bit density will be on each track. Specific techniques for constructing disc stacks are likewise omitted, typically being a matter of design choice to those of ordinary skill in that field of technology.

Definitions and clarifications of certain terms are provided in conjunction with the descriptions below, all consistent with common usage in the art but some described with greater specificity. A "longitudinal" direction is aligned with a sensor's nominal direction of motion in a given (stationary or moving) frame of reference. For example, a transducer following a track is moving longitudinally, whereas a transducer moves "laterally" when seeking. A "lateral" direction is one that forms an angle of more than 45 degrees with the longitudinal direction, and typically more than 70 degrees.

Two fields are written "adjacent" to one another if there is a nominally inadequate space between them for writing additional fields. An ordinary servo sector is adjacent to two data sectors, for example. Similarly, "consecutive" refers to nominally successive items in a (circumferential or temporal) sequential sense. Regularly-spaced items in a sequence can be "consecutive" even if oddly-spaced, dissimilar items are inserted interstitially.

Figure 6:
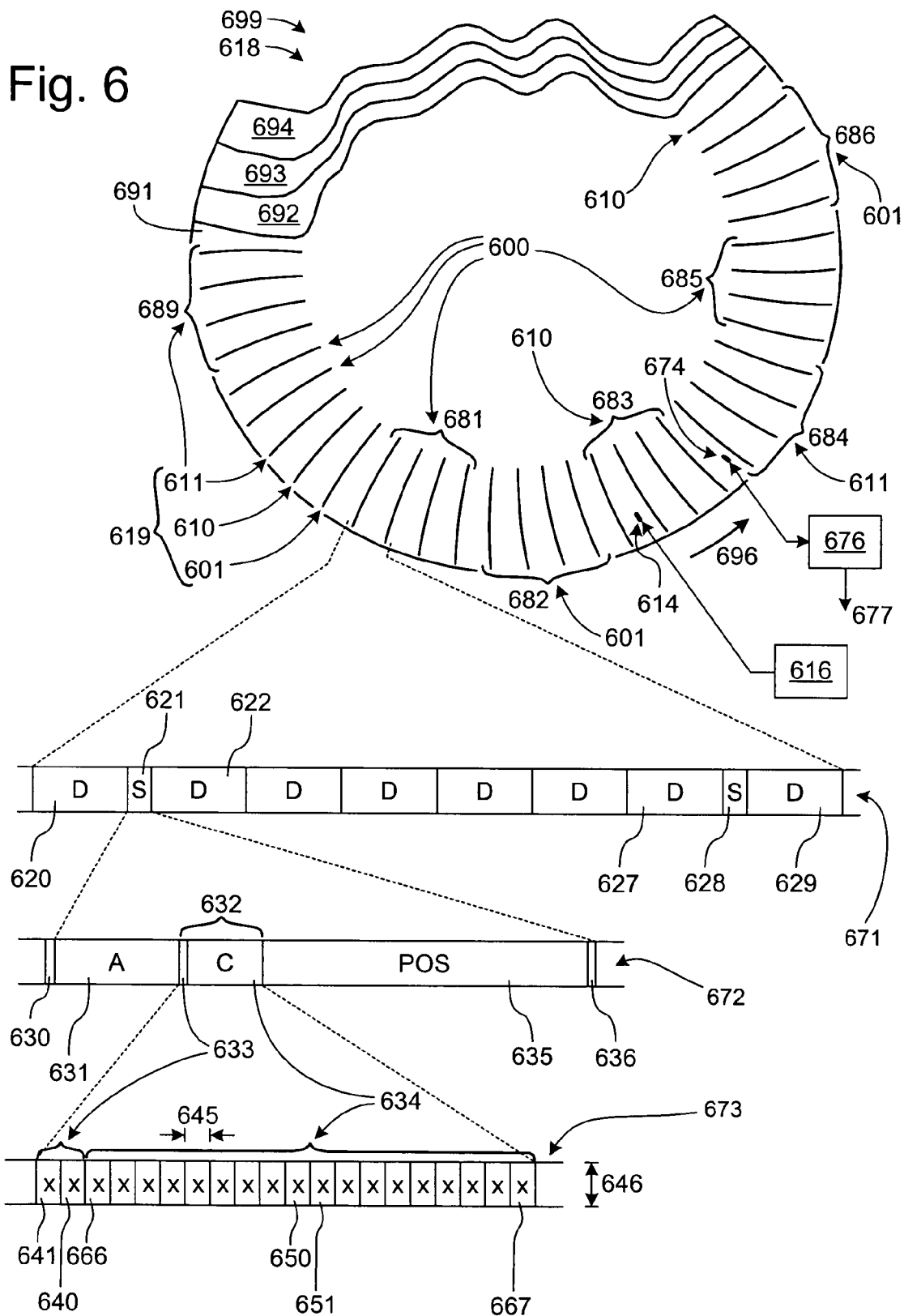
FIG. 6 shows an apparatus of the present invention comprising two controllers each controlling a respective head relative to a rotatable disc stack

Turning now to FIG. 1, there is shown a method 1500 comprising steps 1520 through 1560. Step 1530 is transmitting a bit sequence containing several interspersed bit-group sets that each contain a plurality of series that each consist of several consecutively-placed identical bit-groups. A longitudinal location (such as a circumferential sector number) is determined by reading some of the sequence 1540. Then data is transmitted to or from a location near the determined location 1550. An apparatus configured for executing method 1500 is shown in FIGS. 6 & 7.

Figure 2:
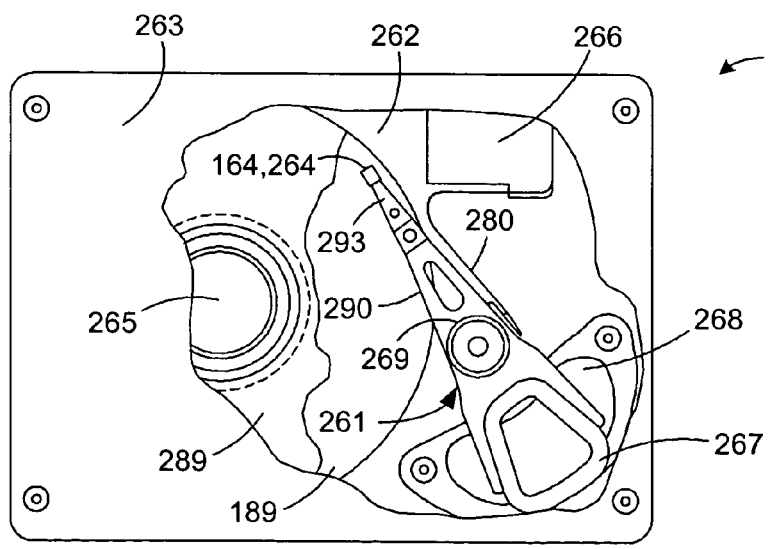
FIG. 2 shows a disc drive constructed to benefit from the present invention.

FIG. 2 shows a "top view" of a disc drive 260 constructed to benefit from the present invention. (Relational terms like "top view" are arbitrary here, in that data handling systems like drive 260 can generally operate in any orientation.) Drive 260 includes "top" cover 263 that cooperates with base 262 to form a sealed chamber. Components supported in the chamber include a spindle motor 265 which rotates a stack comprising one or more data storage discs 189,289 at hundreds or thousands of revolutions per minute. Information is written to and read from data surfaces on the disc(s) 189,289 through the use of an actuator assembly 261, which rotates during a seek operation about a bearing shaft assembly 269. Actuator assembly 261 includes one or more actuator arms 290 which extend above and below each of the disc(s) 189,289, with one or more flexures 293 extending from each of the actuator arms. Mounted at the distal end of each of the flexures is a head 164,264 that can fly in close proximity adjacent the corresponding data surface of an associated disc 189,289.

Servo and user data travels through a selected one of the heads 164,264 and flex cable 280 to control circuitry on controller board 266. (Controller board 266 is configured to perform a method of the present invention shown in FIG. 5, and subsequently to operate in a normal read/write mode.) Flex cable 280 maintains an electrical connection by flexing as each head 164,264 seeks along its path between tracks on disc(s) 189,289. During a seek operation, the overall track position of heads 164,264 is controlled through the use of a voice coil motor (VCM), which typically includes a coil 267 fixedly attached to actuator assembly 261, as well as one or more permanent magnets 268 which establish a magnetic field in which coil 267 is immersed. The controlled application of current to coil 267 causes magnetic interaction between permanent magnets 268 and coil 267 so that coil 267 moves. As coil 267 moves, actuator assembly 261 pivots about bearing shaft assembly 269 and heads 164,264 are caused to move across the surfaces of the disc(s) 189,289 between the inner diameter and outer diameter of the disc(s) 189,289.

Difficulties have arisen in the cost-effective manufacture of data handling systems like that of FIG. 2. Many of the difficulties relate to exceedingly high track pitch and precise timing requirements. For example, servo-writing many thousands of finely-pitched tracks takes a lot longer than servo-writing at lower densities. For this reason some manufacturers are looking to systems for installing pre-written discs into a data handling system. Others are looking to systems for having the data handling system servo-write itself. Both of these techniques can introduce significant offsets between detections of marked positions not previously encountered.

Figure 3:
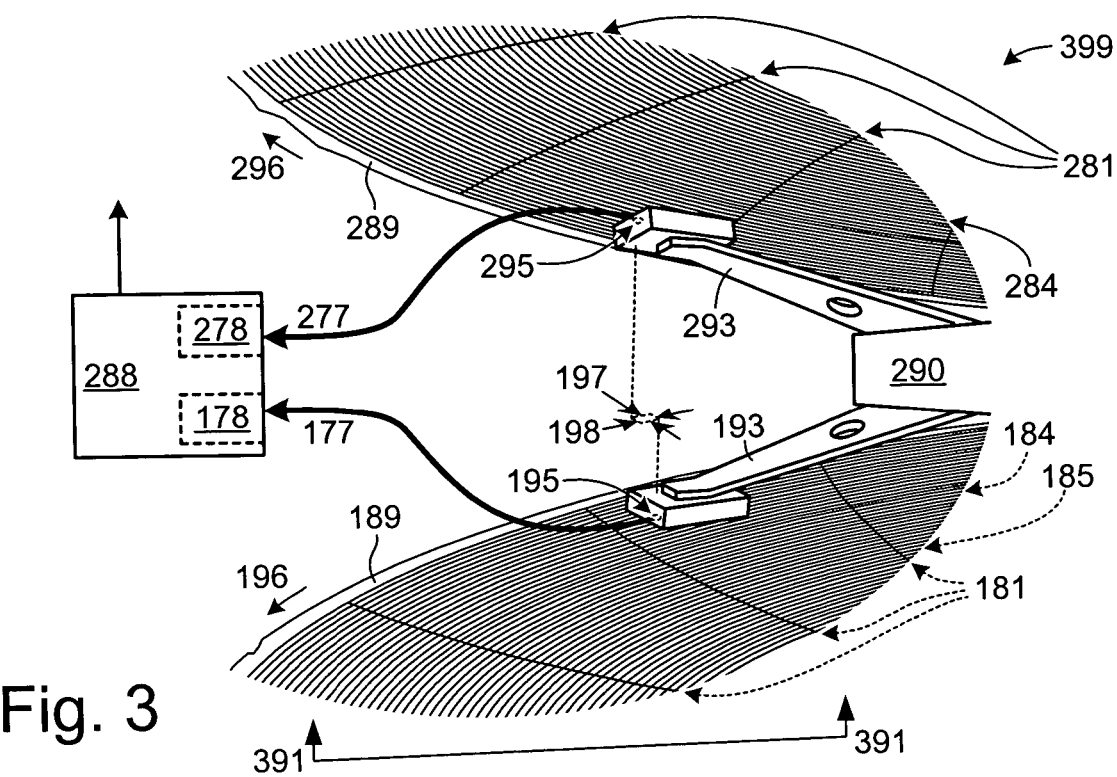
FIG. 3 shows another view of the disc drive of FIG. 2

To illustrate this FIG. 3 shows a close-up "side view" 399 from between two of the discs 189,289 of disc drive 260 (not to scale). As FIG. 3 shows, rotary actuator arm 290 supports read/write transducers 195,295, respectively positioned to access outer tracks 184,185 of disc 189 and/or from outer tracks 284 of disc 289. The pitch of tracks 184,284 is actually exceedingly fine, orders of magnitude denser than those shown. Read/write transducers 195,295 are supported by arm 290 via flexures 193,293.

Note that offset 198 is depicted in a circumferential direction relative to discs 189,289, which rotate on a spindle at a controlled speed about a common axis as shown by respective movement indicators 186,286. Offset 198 shows that transducer 195 leads transducer 295 slightly. Transducer 195 also happens to be closer to the discs' axis of rotation than transducer 295, as indicated by radial offset 197. Transducer 195 generates an output 177 that is received into buffer 178 of processor 288, which is implemented in control circuitry similar to controller board 266 of FIG. 2. Transducer 295 similarly generates an output 277 that is received into buffer 278. (Transducers 195,295 transmit outputs 177,277 via a preamplifier circuit supported on the actuator, not shown.)

An important component of transducer outputs 177,277 is position information found in servo wedges 181,281 on respective surfaces. (In FIG. 3, note that servo wedges 181 will typically not be encountered by transducer 195 at the same time that servo wedges 281 are encountered by transducer 295.) Most or all of the position information that enables transducers 195,295 to stay on their respective tracks is found in marks within the servo wedges. It should be understood that servo "wedges" are so named because they ordinarily taper narrower near the inner tracks of each surface, toward the discs' centers. Also, the wedges are typically not perfectly radial. They each curve in a generally circular arc so that an actuator rotation will not greatly alter the time at which a given servo wedge will be encountered by a corresponding transducer.

Figure 4:
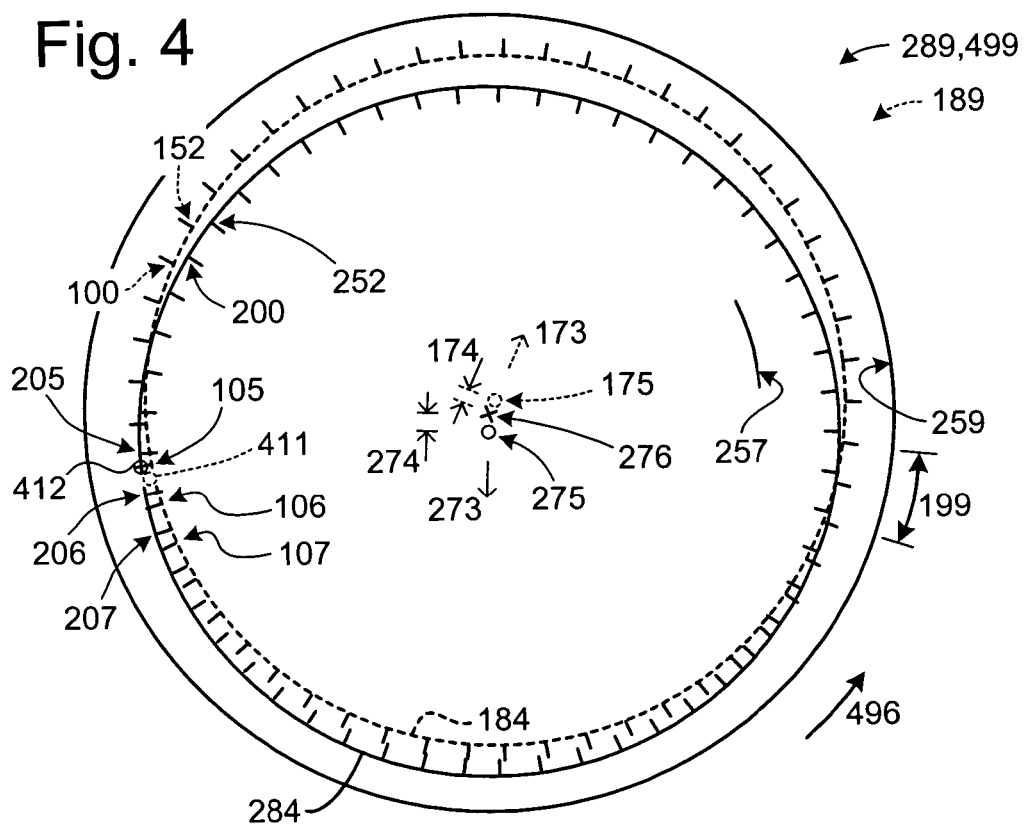
FIG. 4 shows a "bottom view" of selected items in FIG. 3

This can be seen more easily in FIG. 4, a "bottom view" 391 of selected items in FIG. 3, in the rotating frame of reference 499 of disc 289. The extent of permissible motion of each transducer is bounded by an outer diameter 259 and an inner diameter 257, corresponding roughly to track zero and the maximum track, respectively. Transducer 295 follows a nominally circular track 284 near the outer diameter 259, while transducer 195 zigzags along somewhere near offset circular track 184 of disc 189. The circle of track 284 has a center 275 that is offset from the discs' axis of rotation 276 by an offset 274 in a direction (phase) 273 as shown. Track 184 similarly has a center 175 that is offset from the discs' axis of rotations 276 by an offset 174 in a direction (phase) 173 as shown. Offsets 174,274 are shown atypically large for clarity. For pre-written discs installed into a data handling system, it is expected that each track-center offset will be at least one to three orders of magnitude greater than a nominal track pitch. Centering errors of a similar magnitude may arise in field operation, particularly in laptop computers that suffer lateral shocks. Optionally the present invention includes steps of (1) detecting that such a centering error exists in periodic field calibration, and (2) responding so as generally to attenuate seek length estimation errors by recalibrating several values in a table.

Recalling that FIG. 4 is a view from the discs' frame of reference, it will be understood that transducers 195 & 295 seek or track follow radially as they rotate about the axis of rotation 276. At a selected moment of interest, transducer 195 is in position 411 and transducer 195 has just detected position 105 (traveling circumferentially in direction 496 as shown, relative to the discs). It is being de-selected, after which it will encounter positions 106 and 107. Transducer 295 is in position 412, lagging and further out as shown in FIG. 3. Transducer 295 has just encountered position 205 without detecting it, is being activated, and is about to encounter and detect positions 206 and 207. Circumferential positions 100 through 152 on disc 189 are all encountered by transducer 195 during its rotation. Circumferential positions 200 through 252 on disc 289 are all encountered by transducer 295 during its rotation. All of these positions 100-152 & 200-252 are servo wedges (or sectors) that include a servo wedge number (or sector number) that is at least zero and at most W−1, where W is each surface's nominal number of servo wedges. In modern hard disc drives there are typically hundreds of such wedges on each data surface (i.e. W>100). Finally, it should be noted that discs 189,289 of FIG. 4 have a significant angular misalignment 199 (i.e. greater than one microradian) as shown. In fact this is the effective worst case misalignment between any two corresponding servo sectors on the respective disc surfaces, taking circumferential offset 198 between the heads into account. As indicated previously, a coding scheme of the present invention (such as the method of FIG. 5) can readily be made to correct for it with or without a virtual sector offset or any similar calibration devised to account for offsets 174,274 and misalignment 199.

Figure 5:
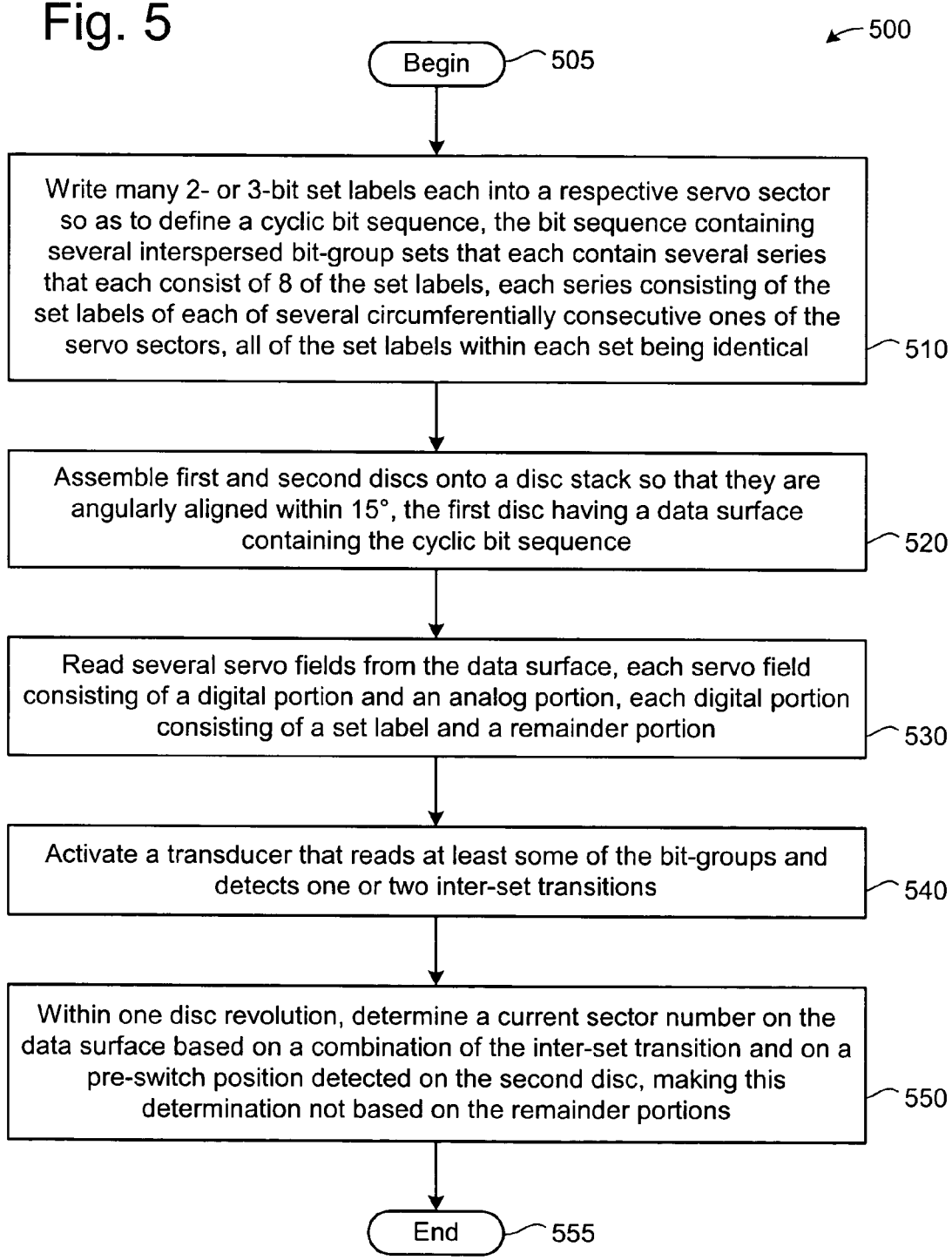
FIG. 5 shows a flowchart of another method of the present invention

FIG. 5 shows a method 500 of the present invention, comprising steps 505 through 555. It step 510, M-bit set labels are each written into a respective sector so as to define a cyclic bit sequence that contains several interspersed bit-group sets that each contain several series that each consists of S of the set labels. (S is desirably equal to $2^N$, where M and N are both integers larger than 1.) This is done so that each series consists of the set labels of each of several circumferentially consecutive ones of the servo sectors, and all of the set labels within each set are identical. (FIGS. 6&7 illustrates a similar scheme in detail.)

A disc stack is assembled with at least two discs, so that the discs are angularly aligned within about 90°, or more preferably within about 15° to 30°, the first disc having a data surface containing the cyclic bit sequence 520. Several servo fields are then read from the data surface, each servo field consisting of a digital portion and an analog portion, each digital portion consisting of a set label and a remainder portion 530. (See FIG. 6) To use a transducer to determine its location relative to its data surface, the transducer reads at least some of the bit-groups and detects one or two inter-set transitions 540. This information is combined with data indicating a pre-switch position to determine a location such as a recent sector number 550. After detecting the inter-set transition(s), this (coarse determination of location) can be made without reference to other portions of the servo fields.

FIG. 6 shows an apparatus 699 of the present invention comprising controllers 616,676 controlling respective heads 614,674 relative to rotatable disc stack 618, which contains several data surfaces 691,692,693,694. Each of the data surfaces contains a cyclic bit sequence 619 arranged in a pattern with a predetermined repeating placement as shown, and containing several interspersed bit-group sets 600,601, 610,611. Set 600 contains series 681,685 that each consist of four circumferentially consecutive identical bit-groups 633. Set 601 similarly contains series 682,686 that each consist of four circumferentially consecutive identical bit-groups 633. Set 610 contains a few series 683 that each consist of four circumferentially consecutive identical bit-groups 633. Set 611 contains series 684,689 that each consist of four circumferentially consecutive identical bit-groups 633.

Bit-groups 633 are far too small to be seen directly on data surface 691, for which reason FIG. 6 includes a magnified view 671. View 671 shows several (circumferentially) adjacent data sectors 622 through 627 between two servo sectors 621,628. Servo sectors 621,628 are each likewise adjacent to two respective data sectors 620,622,627,629.

Bit-groups 633 are also too small to be seen directly in view 671, for which reason FIG. 6 further includes a more magnified view 672 showing the vicinity of servo sector 621. Preceding servo sector 621 is a gap 630 in data sector 620 that is nominally at least as long as a few bit-lengths 645. Servo sector 621 also contains a gap 636 nominally as long as a few bit-lengths 645. Gaps 630,636 provide a margin of timing error for the transducer that writes or overwrites either the servo sector 621 or the data sectors 620,622.

Servo sector 621 further contains an analog-data field 631 that contains an automatic gain control, synch marks, and similar analog data. Servo sector 621 has another analog-data field 635 with servo bursts for fine positioning. The digital portion 632 of servo sector 621 includes a bit-group 633 for indicating sector number (i.e. a circumferential location) and additional bits 634 for indicating cylinder number (i.e. a radial location).

Bit-groups 633 are also too small to be seen properly in view 672, for which reason FIG. 6 further includes a most magnified view 673. There it can be seen that digital portion 632 consists of 20 bits in this example. Two of the bits 640,641 (for M=2) comprise bit-group 633, and the remaining 18 bits 650 through 667 contain the cylinder number. Bits 667 and 666 are the most significant bits and bits 650 and 651 are the least significant bits, in accordance with a typical Gray code implementation. Note that other positions of the bits 640,641 of group 633, and other arrangements of the other bits 634 within digital portion 632 are also viable.

All of these views 671,672,673 are sufficiently "to scale" to illustrate some advantages of this embodiment. For example, the scale of FIG. 6 accurately indicates that the bit-groups 633 occupy a total area (nominally) of at most about 0.2% to 2% of the nominal area occupied by the servo sectors 621. Also the bit-groups 633 each occupy an area of at most about 10% to 15% of the digital portion 632 of servo sector 621. (The bits as shown each have a nominal bit-length 645 and bit-width 646 together indicating a nominal bit-area that pertains at least to each track.)

Controllers 616,676 are each configured to execute a portion of method 1500 of FIG. 1. Step 1530 is preferably performed at a multi-disc write station, controller 616 using several transducers 614 moving in direction 696 relative to data surface 691 to write servo fields simultaneously onto data surfaces 691 ex situ. The discs are then removed from controller 616. Later, controller 676 moves head 674 in relative direction 696 and performs the determination step 1540 to generate a location-indicative output 677. Using this output 677, the controller then uses transducer 674 to transfer data to fulfill step 1550.

FIG. 7 shows a simplified schematic view of several items in FIG. 6. Here, controller output 677 is shown as an integer that increases circumferentially until it reaches a preset position (i.e. the index), at which it is reset to zero. This number varies from 0 to W−1 here, where W is the number of servo wedges on data surface 691. Cyclic bit sequence 619 is variously shown as 2-bit groups; 4-group series 681,682,683,684,685; and as sets 600,601,610,611. Note that the set reference number in this example is always a six followed by two digits that make a binary number corresponding to all bit-groups in the set. In other words, each of the bit-groups 633 is a set-identifying label that uniquely identifies which one of the sets 600,601,610,611 to which the bit-group belongs.

FIG. 8 shows a flowchart of another method 810 embodying the present invention, exemplifying a series of steps 820 through 880 that can be performed by controller 676 of FIG. 6 upon bit sequence 619 as shown in FIGS. 6&7. In step 830, consecutive bit-groups 633 are read so as to find two most-recent inter-set transitions in a just-read bit-group pattern consistent with known bit sequence 619. Note that it is possible, and even likely, that this will not be enough of bit sequence 619 to locate sector zero unambiguously. If the just-read pattern presents no ambiguity 840, it is because some of the sectors (left of sector zero as shown in FIG. 7) are near the index sector. In this case step 850 is accomplished either directly or by reading a decrementing bit-group pattern that is unique in sequence 619. (Step 840 is facilitated by the fact that sequence 619 is arranged so that all of the sector transitions increment in a cycle, "01" to "10" to "11" to "00", etc., except a few sectors immediately adjacent to the index sector.

Another property of sequence 619 is that no single bit-group misread as "00" can mislead controller 676 as to the location of transducer 674. That is to say that such an error would result in a just-read pattern inconsistent with sequence 619, causing a continuation of step 830. In this way, sequence 619 enhances the robustness of the location-determining system. Note also that step 830 can always be accomplished in at most 3×S servo sectors, absent read errors, where S is the maximum length of same-valued bit-group series. (In FIG. 7, S=4.)

If the just-read pattern creates a positional ambiguity 840, it can be resolved by applying an a priori position range 860 like that discussed above relating to angular misalignment 199 in FIG. 4. Alternatively, it can be resolved by substituting several series with fewer than S bit-groups in each so as to create more-distinguishable patterns. In either case, once any ambiguity is resolved, a servo sector ID is computed, enabling a target data sector to be reached 870.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to data handling devices, other applications involving the interpretation of cyclic bit sequences can readily benefit from these teachings without departing from the scope and spirit of the present invention.

Moreover, it will be appreciated by those skilled in the art that the selection of a suitable configuration of series of consecutively-placed identical bit-groups involves several trade-offs. The best solution will depend on the application, and except as specified below, no particular solution to this trade-off is of critical importance to the present invention. Moreover a selection of designs will typically be available and readily derived, depending on the robustness and other performance characteristics required. One of ordinary skill will be able to use the above description to design and implement a variety of methods and devices using suitable bit sequences in light of the teachings above, without undue experimentation.

What is claimed is:

1. A method comprising a step (a) of determining a location within a cycle by reading a portion of a cyclic bit sequence, the bit sequence containing several interspersed bit-group sets that each contain a plurality of series that have servo sectors consecutively-placed between data sectors, wherein all of the servo sectors in each bit-group set includes bit-groups having identical bits.

2. The method of claim 1 in which the determining step (a) includes steps of:
   (a1) reading several servo fields from a data surface, each of the servo fields consisting of a respective one of the bit-groups, an analog portion and a digital remainder portion; and
   (a2) deriving a sector number from the bit-groups and not from the digital remainder portions, the sector number being the determined location within the cycle.

3. The method of claim 1 further comprising a step (b) of accessing a sector having a sector number, the sector number being the determined location within the cycle.

4. The method of claim 1 in which the determining step (a) includes a step (a1) of writing each of the bit-groups as a mutually adjacent plurality of bits within a respective servo field.

5. The method of claim 1 in which the determining step (a) includes a step (a1) of selecting each of the sets so that each of the bit-groups in the set uniquely identifies the set.

6. The method of claim 1 in which the determining step (a) includes a step (a1) of writing several of the series consecutively and so that the series each consist of exactly S consecutively-placed bit-groups, where S>3.

7. The method of claim 1 in which the determining step (a) includes a step (a1) of assembling a several data surfaces into a co-rotating assembly so that a pair of the data surfaces have a significant angular misalignment smaller than a predetermined threshold, at least one of the pair containing the cyclic bit sequence.

8. The method of claim 1 in which the determining step (a) includes steps of:
   (a1) assembling first and second disc surfaces into a co-rotating assembly so that the surfaces have a significant angular misalignment, the second disc containing the cyclic bit sequence;
   (a2) measuring a first position on the first disc or surface;
   (a3) reading the cyclic bit sequence portion from the second disc or surface; and
   (a4) determining the location based on a combination of the first position from the measuring step (a2) and the sequence portion from the reading step (a3).

9. The method of claim 1 in which the determining step (a) is completed within one disc revolution of activating a transducer that reads from the cyclic bit sequence.

10. The method of claim 1 in which the determining step (a) includes a step (a1) of writing each of the bit-groups within a few nominal bit-lengths of a respective track identifier.

11. The method of claim 1 in which the determining step (a) includes steps of:
   (a1) reading a bit pattern from a data surface containing the cyclic bit sequence;
   (a2) verifying that the bit pattern from the reading step (a1) is consistent with the bit sequence; and
   (a3) accepting the bit pattern as the read portion based on the verification step (a2).

12. The method of claim 1 in which the determining step (a) includes a step (a1) of mounting two data surfaces so as to generate a significant angular misalignment therebetween, each of the data surfaces containing the cyclic bit sequence.

13. The method of claim 1 in which the determining step (a) includes a step (a1) of detecting a plurality of inter-set transitions in the read portion of the bit sequence.

14. An apparatus comprising at least one rotatable element containing a cyclic bit sequence, the bit sequence containing several interspersed bit-group sets that each contain a plurality of series that each consist of several circumferentially consecutive identical bit-groups, wherein each of the bit-groups resides in a respective nominally-contiguous digital portion of a respective servo sector, each digital portion is bound by two respective non-digital portions of the respective servo sector occupying a total area A, each of the bit groups occupying a smaller area B.

15. The apparatus of claim 14, wherein smaller area B is almost about 15% of A.

16. The apparatus of claim 14 in which the cyclic bit sequence resides on one annular data surface of the rotatable element, in which the data surface includes a multitude of servo sectors each containing one of the bit-groups, the servo sectors occupying a total area A, the bit-groups occupying a smaller area B<2% of A.

17. The apparatus of claim 14 in which each of the bit-groups is a set-identifying label that identifies a respective one of the several sets.

18. The apparatus of claim 17 in which each of the bit-groups resides in a respective nominally-contiguous digital portion of a respective servo sector, each of the digital portions being bounded by two respective non-digital portions of the respective servo sector, each of the digital portions occupying a total area A, each of the bit-groups occupying a smaller area B that is at most about 15% of A.

19. The apparatus of claim 17 in which the cyclic bit sequence resides on one annular data surface of the rotatable element, in which the data surface includes a multitude of servo sectors each containing one of the bit-groups, the servo sectors occupying a total area A, the bit-groups occupying a smaller area B<2% of A.

20. The apparatus of claim 17, further comprising a controller configured to determine an angular location on the element by reading a plurality of the bit-groups.

21. The apparatus of claim 14, further comprising a controller configured to determine an angular location on the element by reading a plurality of the bit-groups.

22. The apparatus of claim 21 in which each of the bit-groups resides in a respective nominally-contiguous digital portion of a respective servo sector, each of the digital portions being bounded by two respective non-digital portions of the respective servo sector, each of the digital portions occupying a total area A, each of the bit-groups occupying a smaller area B that is at most about 15% of A.

23. The apparatus of claim 21 in which the cyclic bit sequence resides on one annular data surface of the rotatable element, in which the data surface includes a multitude of servo sectors each containing one of the bit-groups, the servo sectors occupying a total area A, the bit-groups occupying a smaller area B<2% of A.

24. An apparatus comprising at least one rotatable element having at least one track and at least one cyclic bit sequence, the bit sequence containing multiple interspersed bit-group sets that each contain a plurality of series that have servo sectors consecutively-placed between data sectors, wherein all of the servo sectors in each bit-group set includes bit-groups having identical bits distributed along the track, in which the identical bit-groups reside in selected consecutive ones of the servo sectors.

* * * * *